(12) United States Patent
Wingen

(10) Patent No.: US 8,490,582 B1
(45) Date of Patent: Jul. 23, 2013

(54) SYSTEM FOR WASTE HEAT RECOVERY FOR A FLUID HEATER

(75) Inventor: Patrick G. Wingen, Elk Point, SD (US)

(73) Assignee: Aaladin Industries, Inc., Elk Point, SD (US)

( * ) Notice: Subject to any disclaimer, the term of this patent is extended or adjusted under 35 U.S.C. 154(b) by 972 days.

(21) Appl. No.: 12/566,429

(22) Filed: Sep. 24, 2009

(51) Int. Cl.
*F22D 5/00* (2006.01)

(52) U.S. Cl.
USPC ............... 122/415; 122/DIG. 10; 122/406.1; 165/104.11

(58) Field of Classification Search
USPC ........ 122/7 R, 32, 33, 406.1, 406.2, DIG. 10, 122/451 S, 415, 414; 165/66, 104.11, 104.13, 165/104.14, 104.22
See application file for complete search history.

(56) References Cited

U.S. PATENT DOCUMENTS

| | | | | |
|---|---|---|---|---|
| 1,046,946 | A | | 12/1912 | Beatty |
| 2,479,766 | A | | 8/1949 | Mulvany |
| 2,703,073 | A | * | 3/1955 | Klein et al. .................. 122/360 |
| 4,103,706 | A | | 8/1978 | Moog |
| 4,163,430 | A | | 8/1979 | Neumann |
| 4,241,588 | A | | 12/1980 | Murphy |
| 4,284,127 | A | | 8/1981 | Collier |
| 4,318,367 | A | | 3/1982 | Antonucci |
| 4,401,261 | A | * | 8/1983 | Brown ............................ 236/10 |
| 4,429,830 | A | | 2/1984 | Forster |
| 4,452,180 | A | | 6/1984 | Hassan |
| 4,512,288 | A | | 4/1985 | Michaud |
| 4,583,494 | A | | 4/1986 | Gordon |
| 4,628,869 | A | | 12/1986 | Symsek |
| 4,844,020 | A | * | 7/1989 | Bruhn ........................... 122/7 R |
| 4,940,082 | A | | 7/1990 | Roden |
| 5,570,578 | A | | 11/1996 | Saujet |
| 6,183,161 | B1 | | 2/2001 | Neeper |
| 6,345,769 | B2 | * | 2/2002 | MacIntyre .................... 237/8 R |
| 6,532,906 | B1 | | 3/2003 | Knoeppel |
| 6,564,755 | B1 | | 5/2003 | Whelan |
| 7,021,554 | B2 | | 4/2006 | Clark |
| 7,258,080 | B2 | | 8/2007 | Missoum |
| 7,360,535 | B2 | * | 4/2008 | Kobayashi ................. 126/350.1 |
| 7,392,767 | B2 | * | 7/2008 | Franklin et al. ................. 122/33 |
| 2008/0011457 | A1 | | 1/2008 | Mirolli |
| 2011/0232696 | A1 | * | 9/2011 | Barrios et al. ................ 134/105 |
| 2011/0253179 | A1 | | 10/2011 | Barrios |

OTHER PUBLICATIONS

ECOS Mobile Wash/Reclaim System, www.landa.com.
Office Action for U.S. Appl. No. 13/470,592, dated Sep. 4, 2012.

* cited by examiner

*Primary Examiner* — Gregory A Wilson
(74) *Attorney, Agent, or Firm* — Jeffrey A. Proehl; Woods, Fuller, Shultz & Smith, P.C.

(57) ABSTRACT

A fluid heating apparatus has a fluid inlet, a fluid outlet, and a fluid path, and comprises a fluid pumping assembly configured to increase the pressure of the fluid on the fluid path, and forms a portion of the fluid path. A heating assembly is configured to heat the fluid between the fluid inlet and outlet, and forms a portion of the fluid path. A heat recovery assembly is configured to recover heat from the exhaust gases, and forms a portion of the fluid path to transfer recovered heat to fluid moving through the fluid path. A collection assembly may be employed to collect condensation from exhaust gases passing through the recovery assembly. A method is also disclosed.

17 Claims, 13 Drawing Sheets

SYSTEM FOR WASTE HEAT RECOVERY FOR A FLUID HEATER

BACKGROUND

1. Field

The present disclosure relates to fluid heating apparatus and more particularly pertains to a new system for waste heat recovery for a fluid heater for capturing a portion of the heat exhausted from the apparatus that would otherwise be lost to the environment during operation, as well as providing the ability to capture vapor and particulate matter in the gases.

2. Description of the Prior Art

A fluid heating apparatus is utilized to increase the temperature of a fluid at the outlet of the apparatus, and may also include a pump to increase the pressure of the fluid at the outlet. In some types of the fluid heater apparatus, a fuel is burned to generate the heat necessary to warm the fluid. The exhaust gases from the combustion leave the heating assembly of the apparatus and are vented to the environment.

SUMMARY

In view of the foregoing, the present disclosure describes a new system for waste heat recovery for a fluid heater which may be utilized to capture a portion of the heat exhausted from the apparatus that would otherwise be lost to the environment during operation.

In one aspect, the present disclosure relates to a fluid heating apparatus having a fluid inlet, a fluid outlet, and a fluid path extending between the fluid inlet and fluid outlet. The apparatus comprises a fluid pumping assembly configured to increase a pressure characteristic of the fluid between the fluid inlet and fluid outlet. The fluid pumping assembly forms a portion of the fluid path to increase the pressure of fluid moving along the fluid path. The apparatus further includes a heating assembly configured to heat the fluid between the fluid inlet and the fluid outlet, and the heating assembly also forms a portion of the fluid path to increase a temperature of the fluid moving along the fluid path. The apparatus also includes a heat recovery assembly configured to recover heat from the exhaust gases. The heat recovery assembly forms a portion of the fluid path to transfer recovered heat to fluid moving through the fluid path.

In another aspect, the present disclosure relates to a fluid heating apparatus having a fluid inlet, a fluid outlet, and a fluid path extending between the fluid inlet and fluid outlet, and the apparatus comprises a fluid pumping assembly configured to increase a pressure characteristic of the fluid between the fluid inlet and fluid outlet. The fluid pumping assembly forms a portion of the fluid path to increase the pressure of fluid moving along the fluid path. The apparatus further includes a heating assembly configured to heat the fluid between the fluid inlet and the fluid outlet, and the heating assembly forms a portion of the fluid path to increase a temperature of the fluid moving along the fluid path. The apparatus also includes a condensation collection assembly configured to collect condensation from exhaust gases produced by the heating assembly. Particulate matter is collected with the collection of the condensed fluid from the exhaust gases.

In still another aspect, the disclosure relates a method of recovering heat from a fluid heater. The method includes providing a fluid heater defining a fluid path between a fluid inlet and a fluid outlet for the fluid heater, with the fluid heater having a heating assembly and a pumping assembly. The method further includes receiving a flow of fluid at the fluid inlet of the fluid path of the fluid heater, with the fluid flow being at a first pressure at the fluid inlet. The method also includes preheating the fluid flow by transferring heat from exhaust gases produced by the heating assembly to the fluid flow moving along the fluid path, the exhaust gases being generated by a heating chamber of the heating assembly. The method still further includes raising the pressure of the fluid flow moving along the fluid path from the first pressure to a second pressure after the preheating of the fluid flow, with the second pressure being higher than the first pressure. The method includes heating the fluid flow moving along the fluid path at the second pressure by passing the fluid flow through the heating chamber of the heating assembly.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
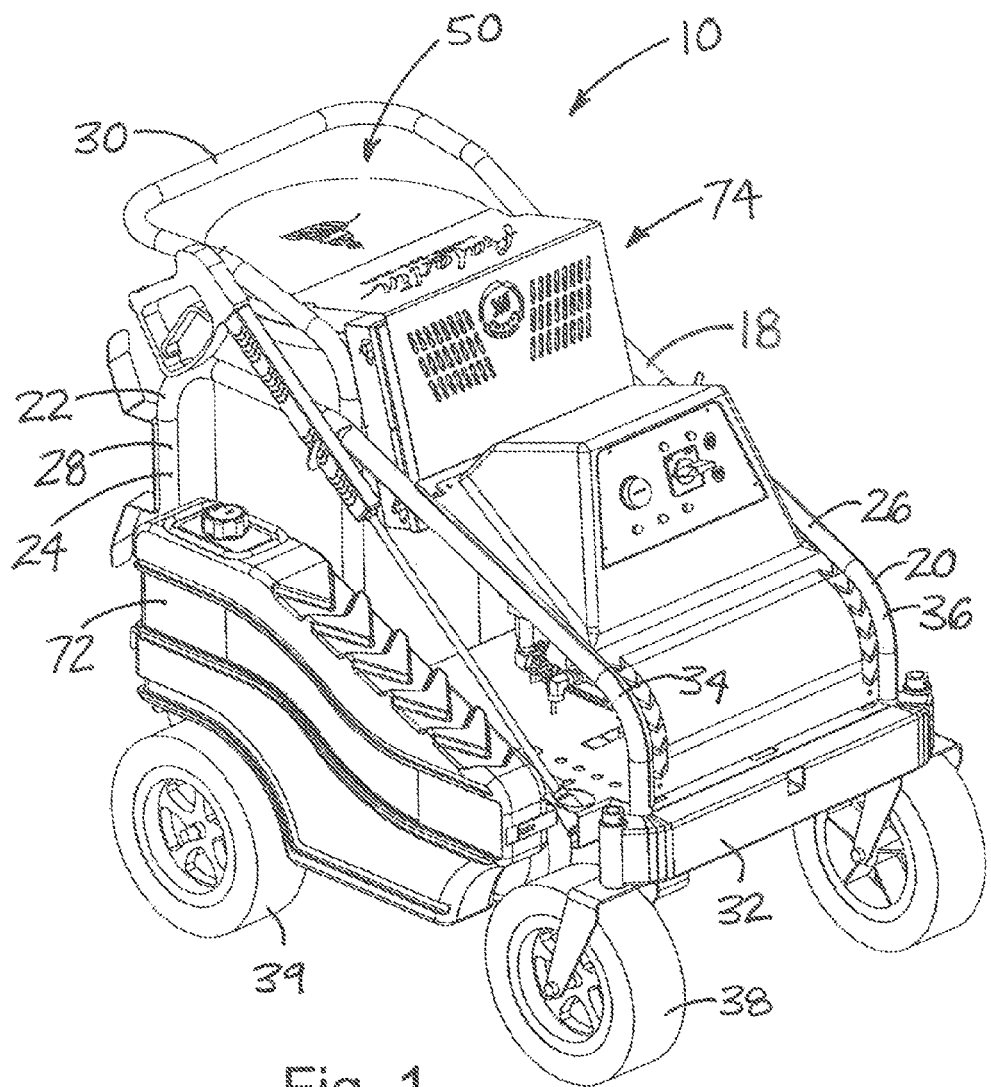
FIG. 1 is a schematic perspective view of a new system for waste heat recovery for a fluid heater according to the present disclosure.
Figure 2:
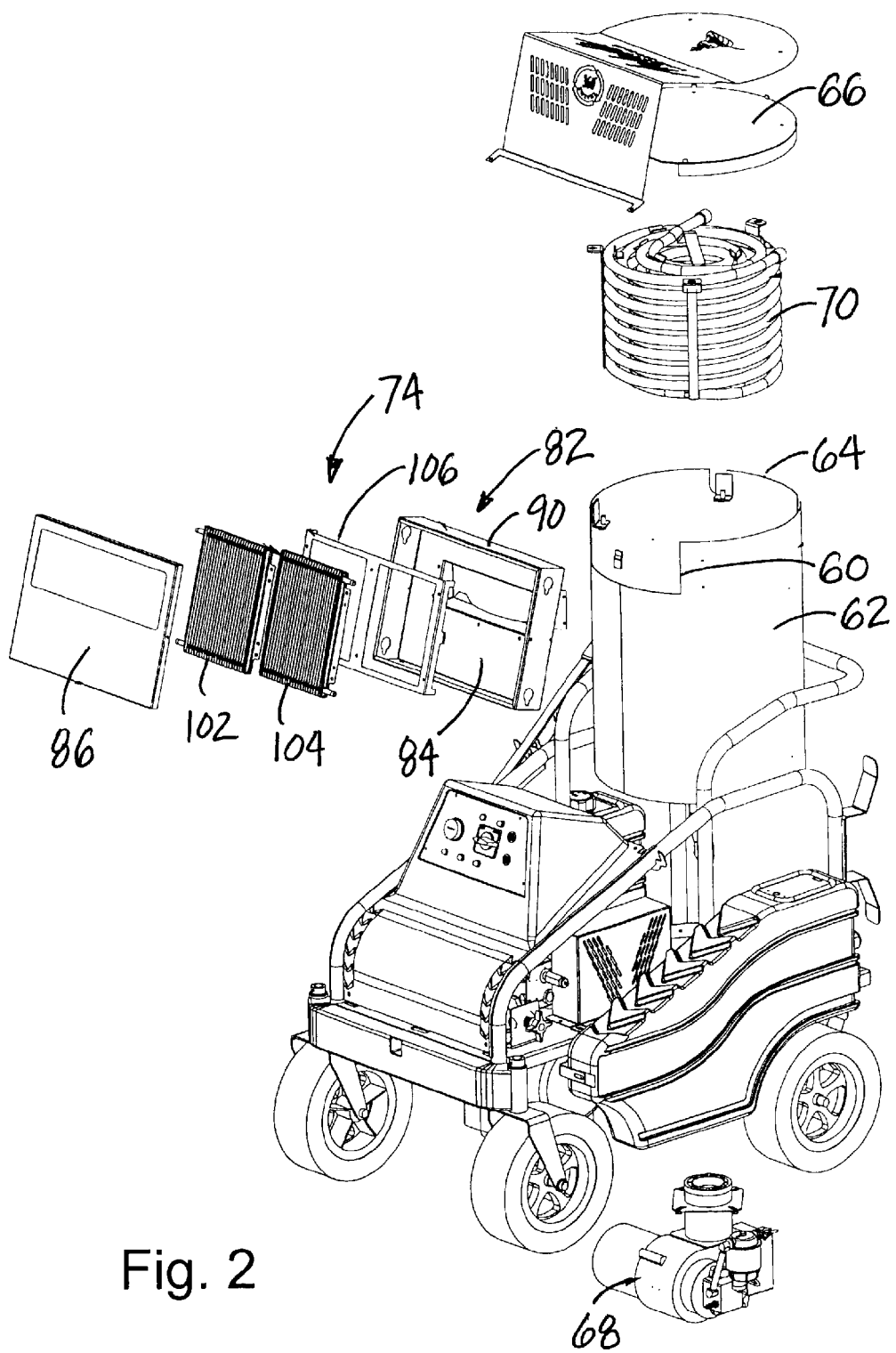
FIG. 2 is a schematic exploded perspective view of the system, according to an illustrative embodiment.
Figure 3A:
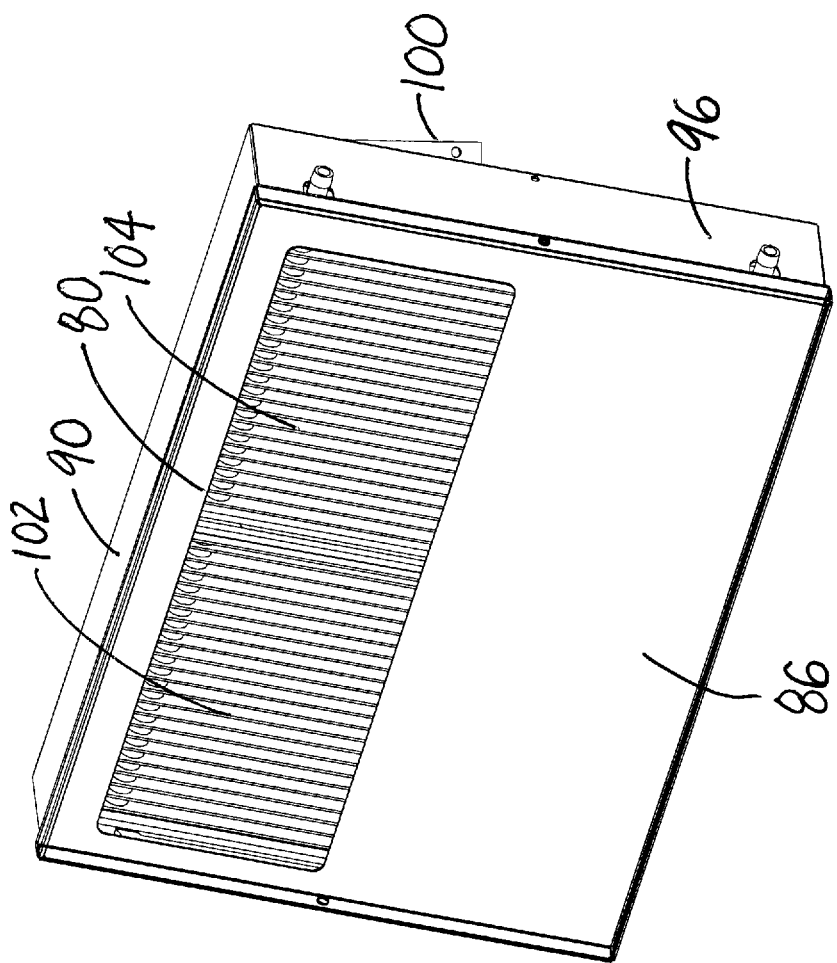
FIG. 3A is a schematic perspective view of the heat recovery assembly of the system, according to an illustrative embodiment.
Figure 3B:
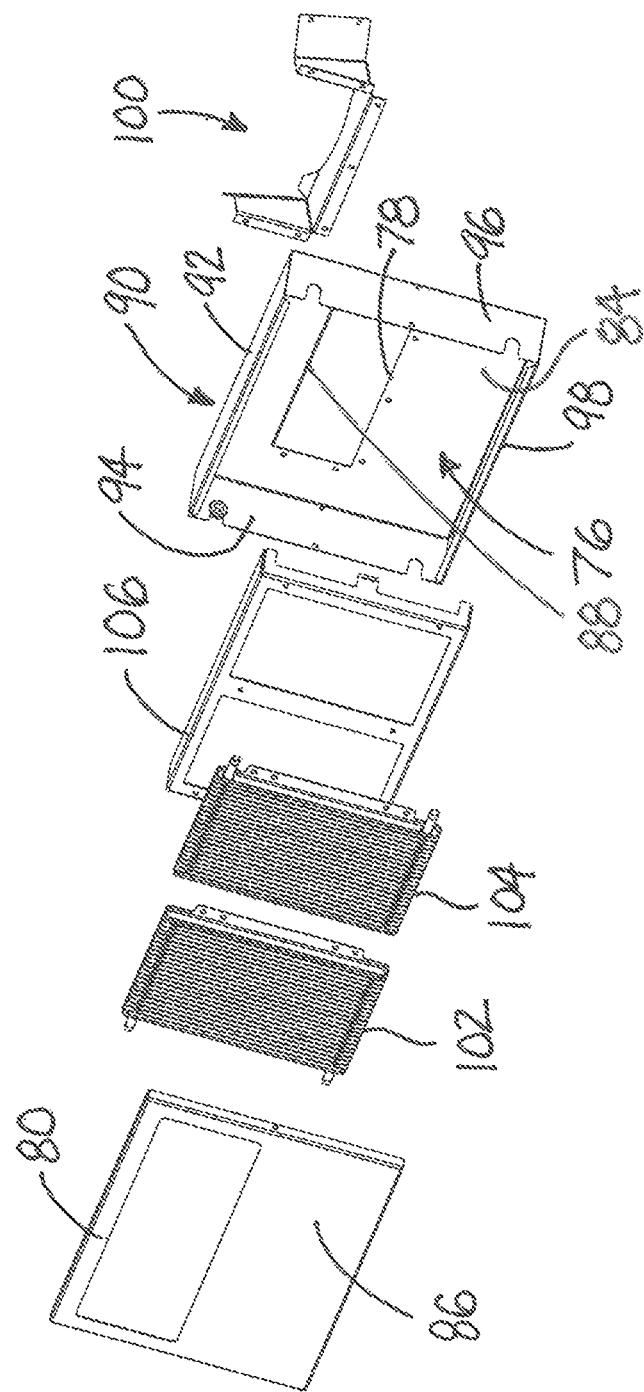
FIG. 3B is a schematic exploded view of the heat recovery assembly of the system shown in FIG. 3A.
Figure 4:
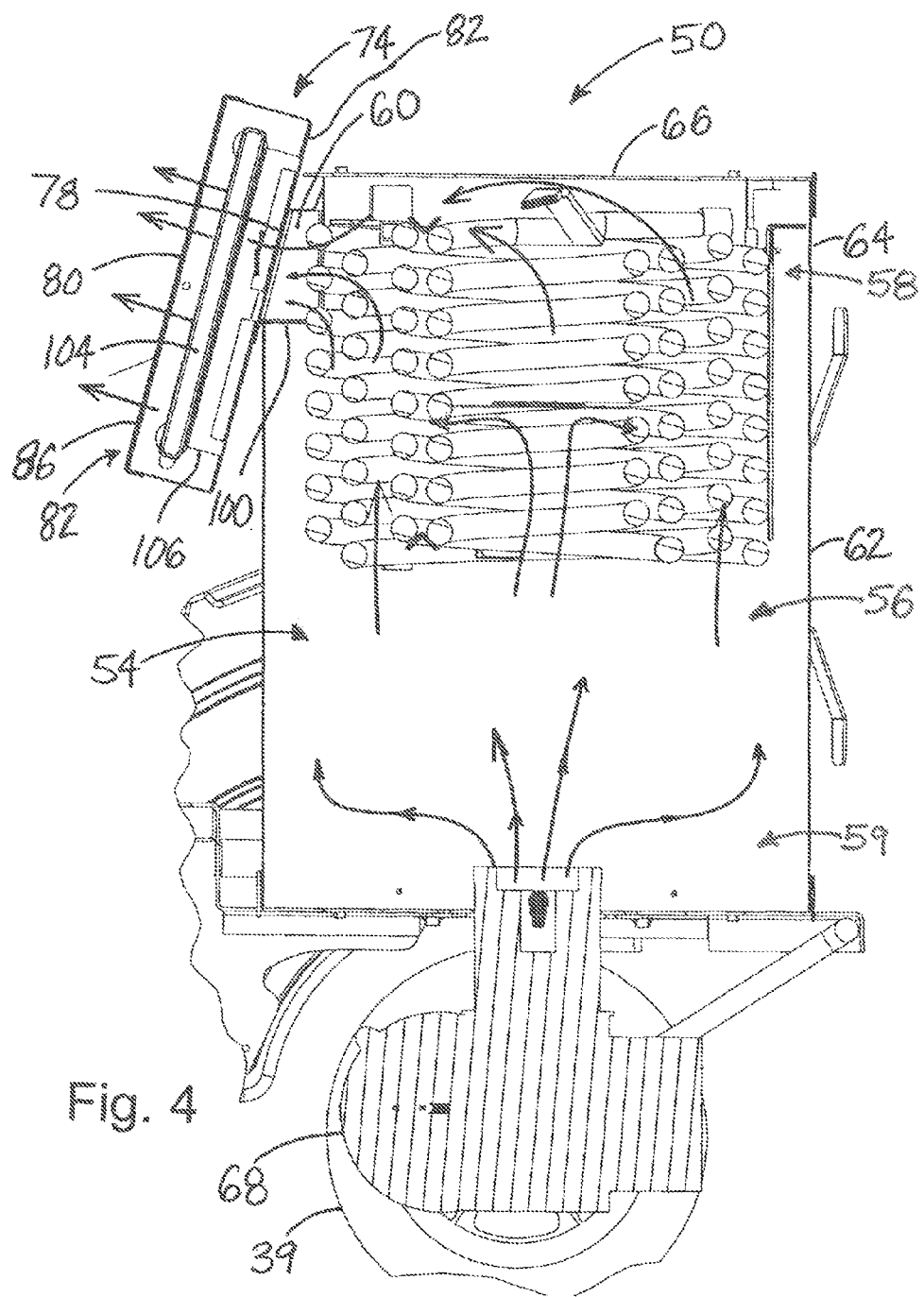
FIG. 4 is a schematic sectional view of the heating assembly and heat recovery assembly, according to an illustrative embodiment.
Figure 5:
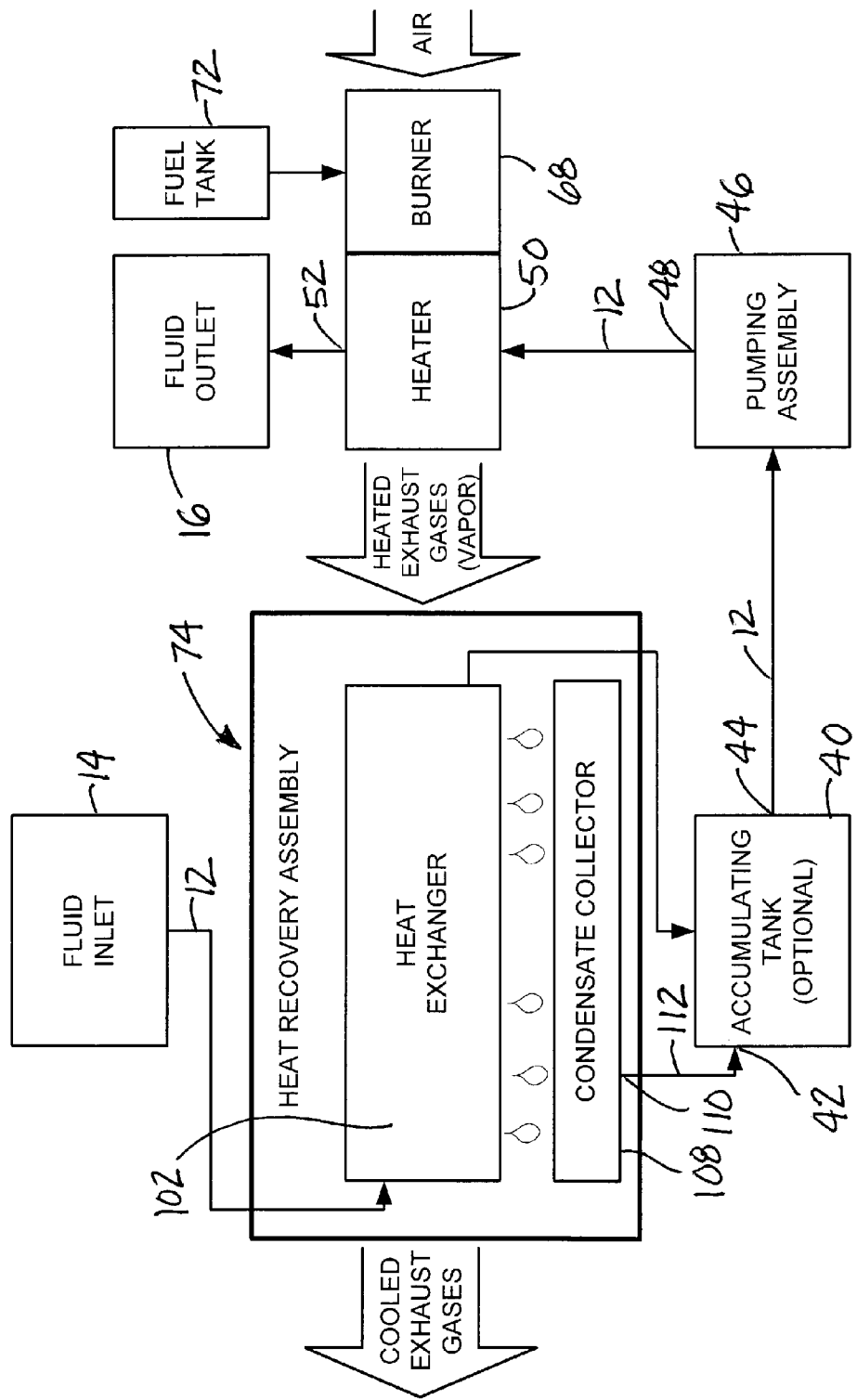
FIG. 5 is a schematic diagram of the system, according to an illustrative embodiment employing a single heat exchanger.
Figure 6:
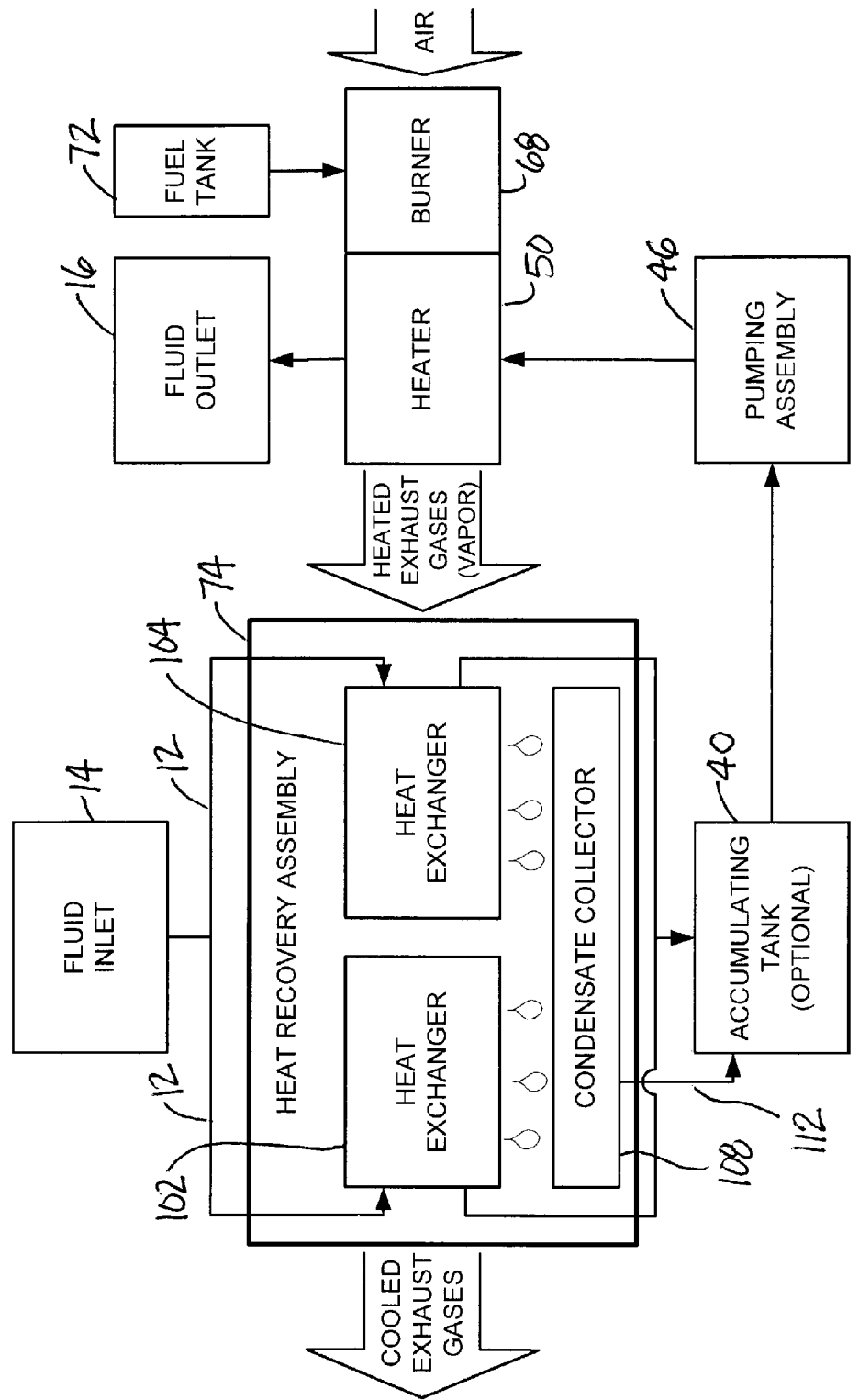
FIG. 6 is a schematic diagram of the system, according to an illustrative embodiment employing multiple heat exchangers with the fluid path passing through the exchangers in parallel.
Figure 7:
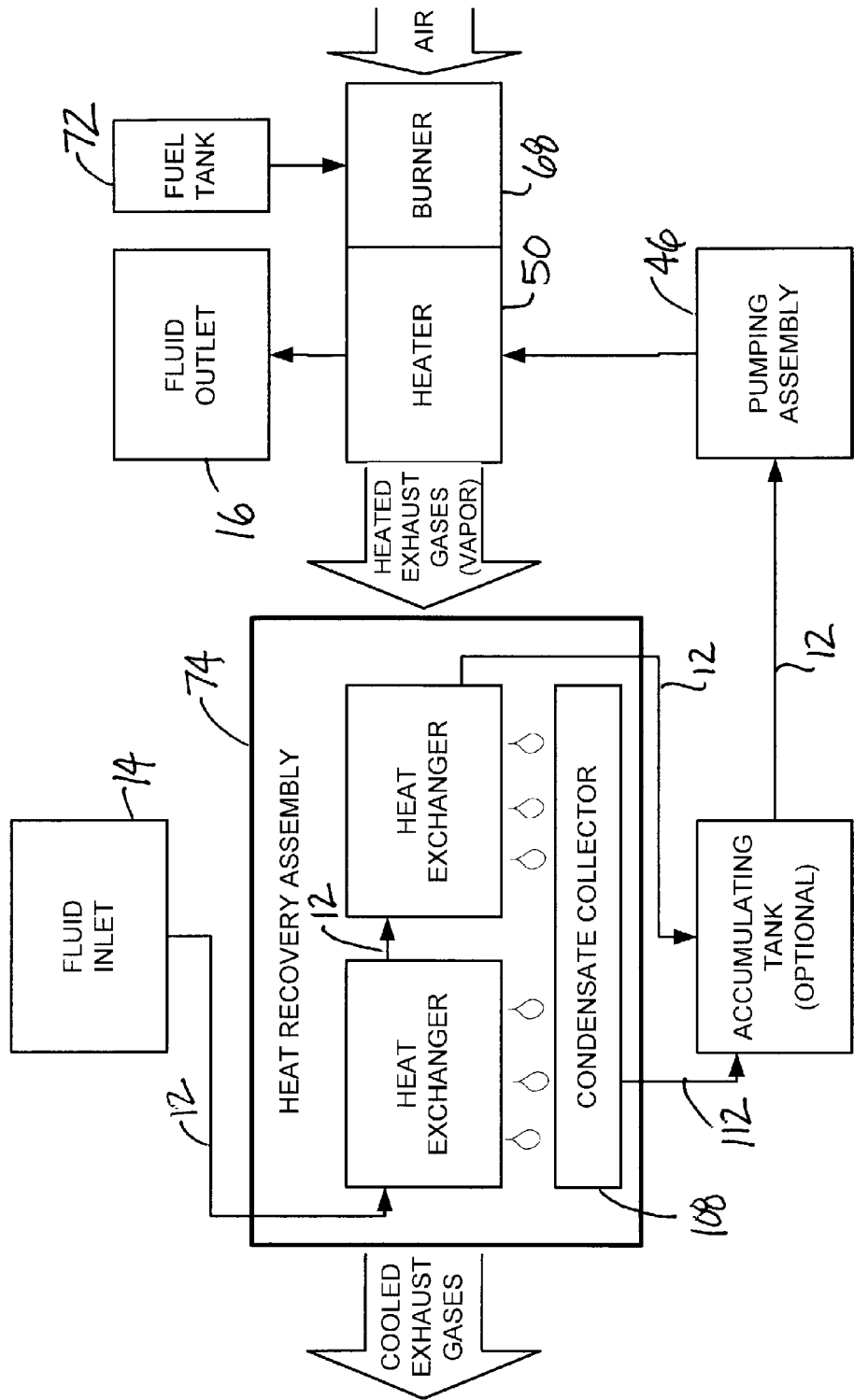
FIG. 7 is a schematic diagram of the system, according to an illustrative embodiment employing multiple heat exchangers with the fluid path passing through the exchangers in series.
Figure 8:
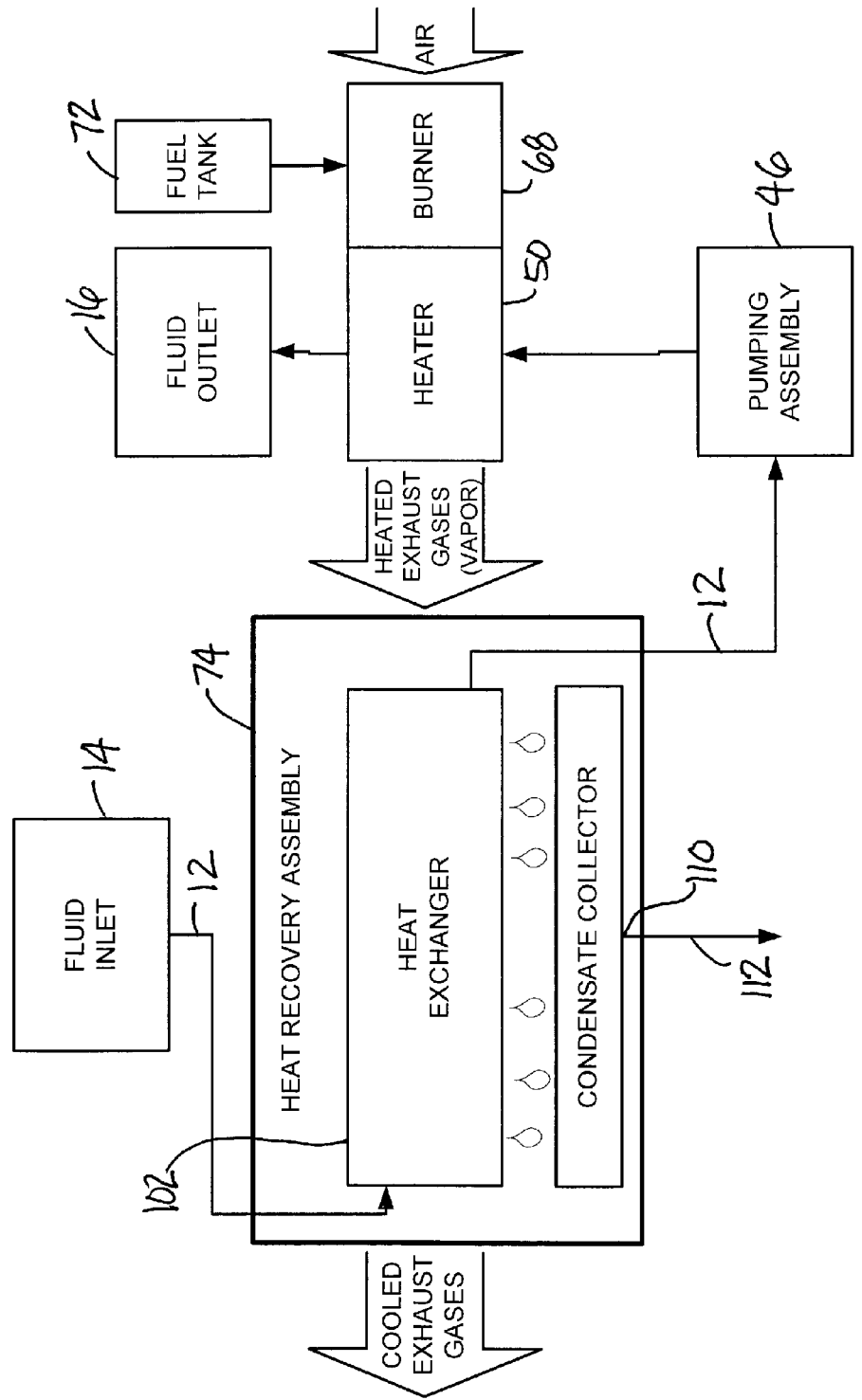
FIG. 8 is a schematic diagram of the system, according to an illustrative embodiment employing a single heat exchanger without a fluid accumulating tank in which condensation is not introduced into the fluid flow along the fluid path.
Figure 9:
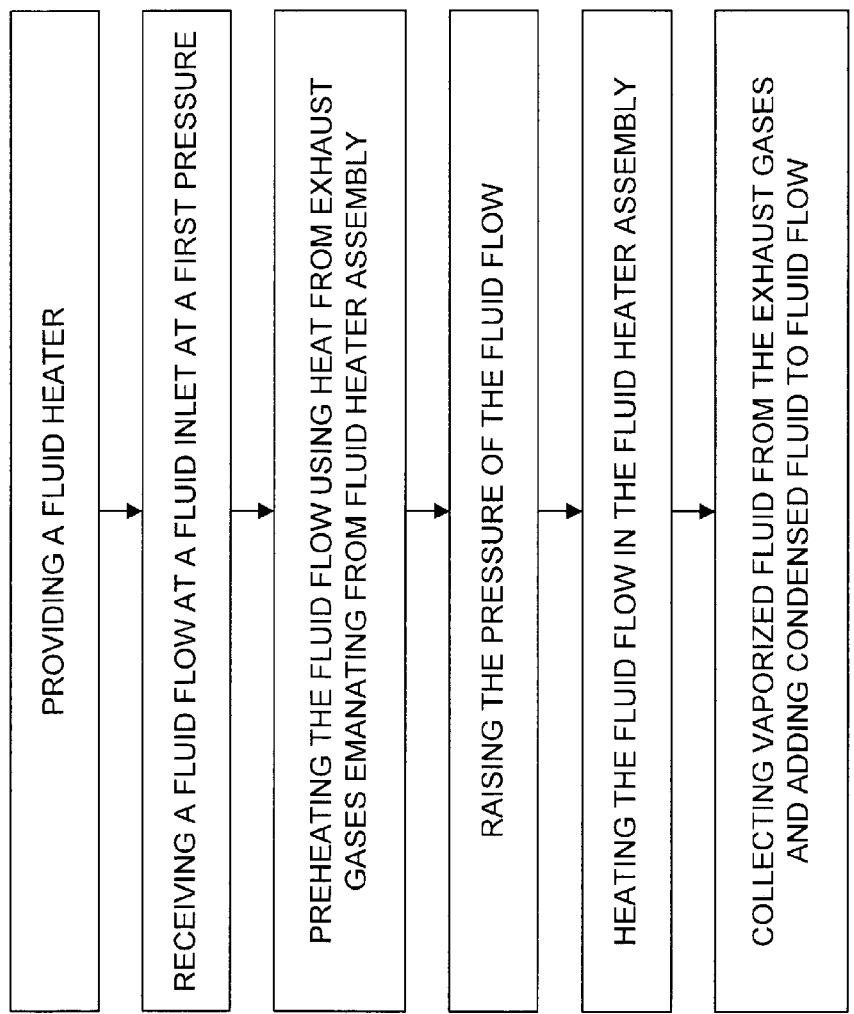
FIG. 9 is a schematic flow diagram of a method of the system according to an illustrative implementation.
Figure 10:
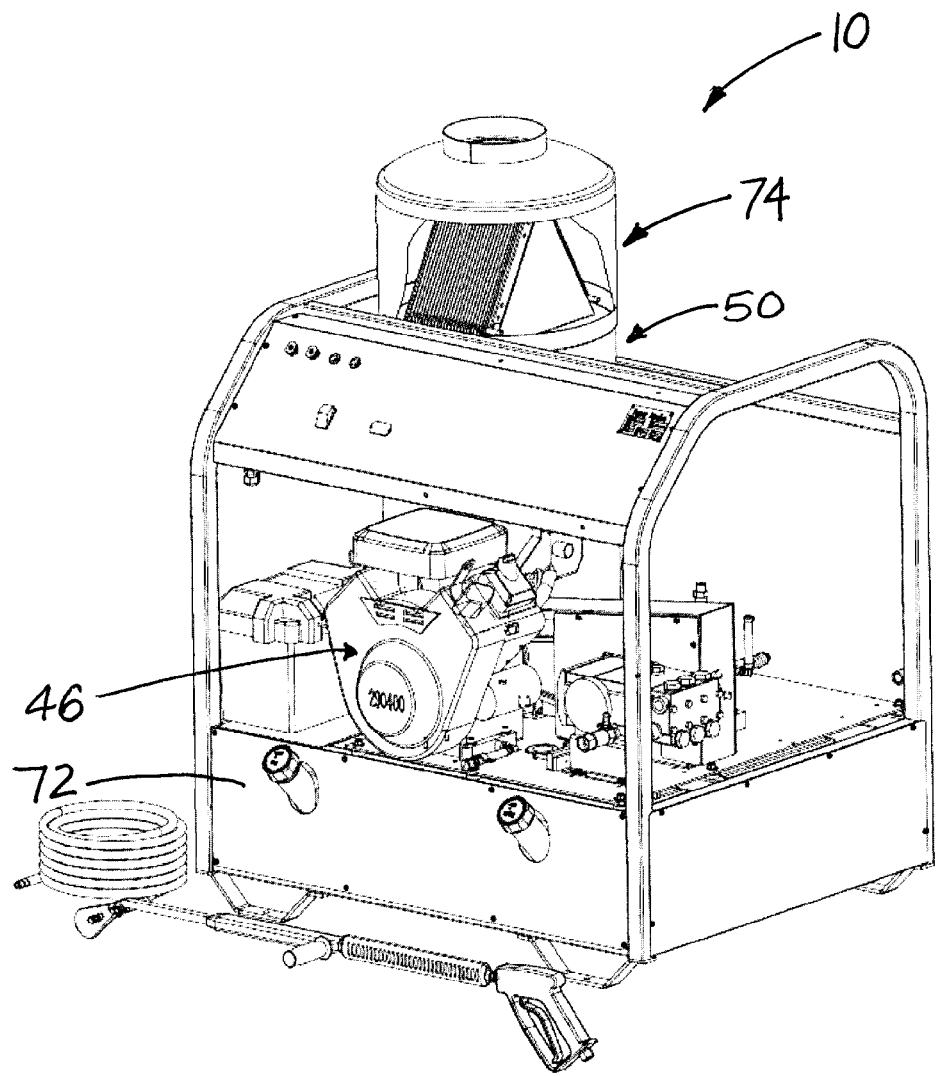
FIG. 10 is a schematic perspective view of a fluid heating apparatus mounted on a skid and employing a gasoline engine for the pumping assembly, with the heating chamber of the heating assembly being vertically oriented.
Figure 11:
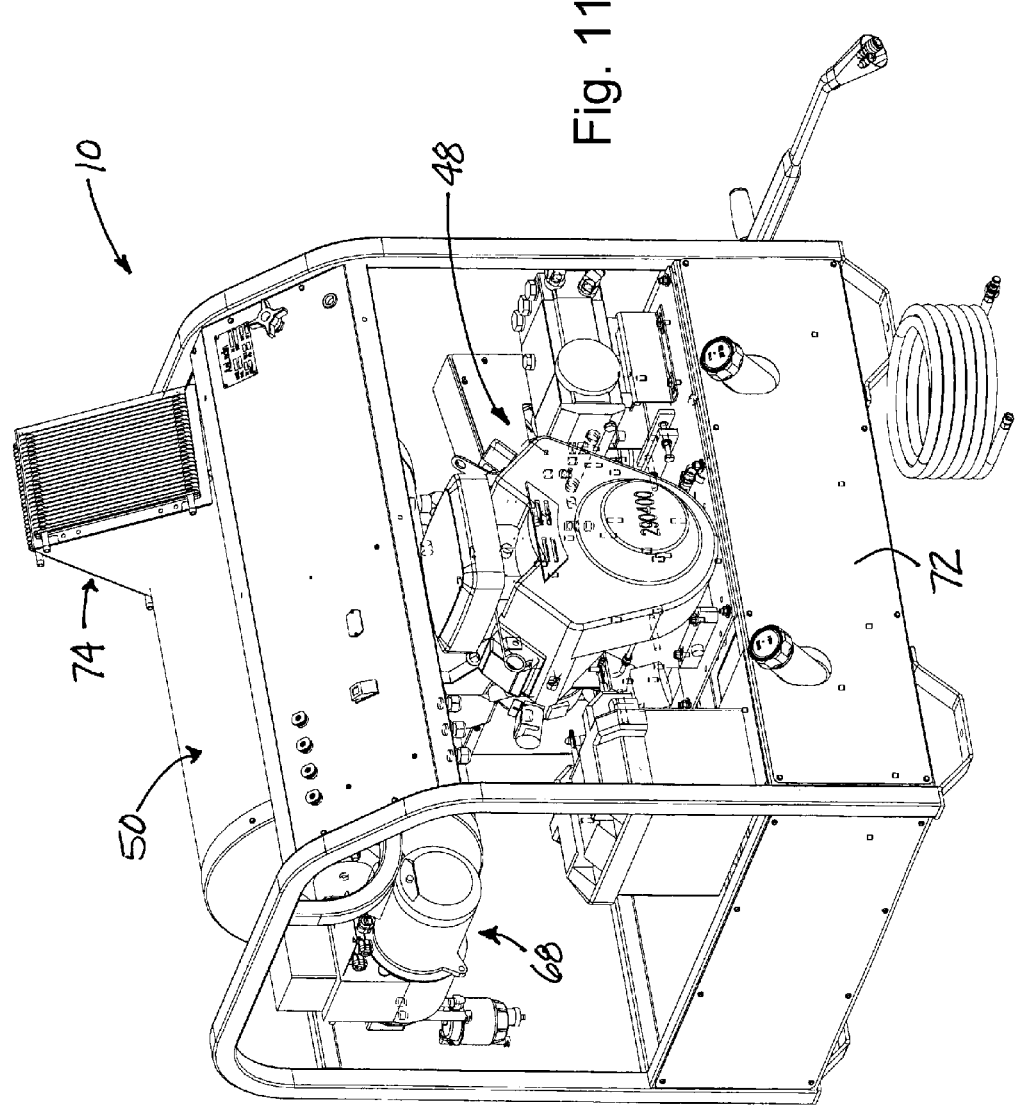
FIG. 11 is a schematic perspective view of a fluid heating apparatus mounted on a skid and employing a gasoline engine for the pumping assembly, with the heating chamber of the heating assembly being horizontally oriented.
Figure 12:
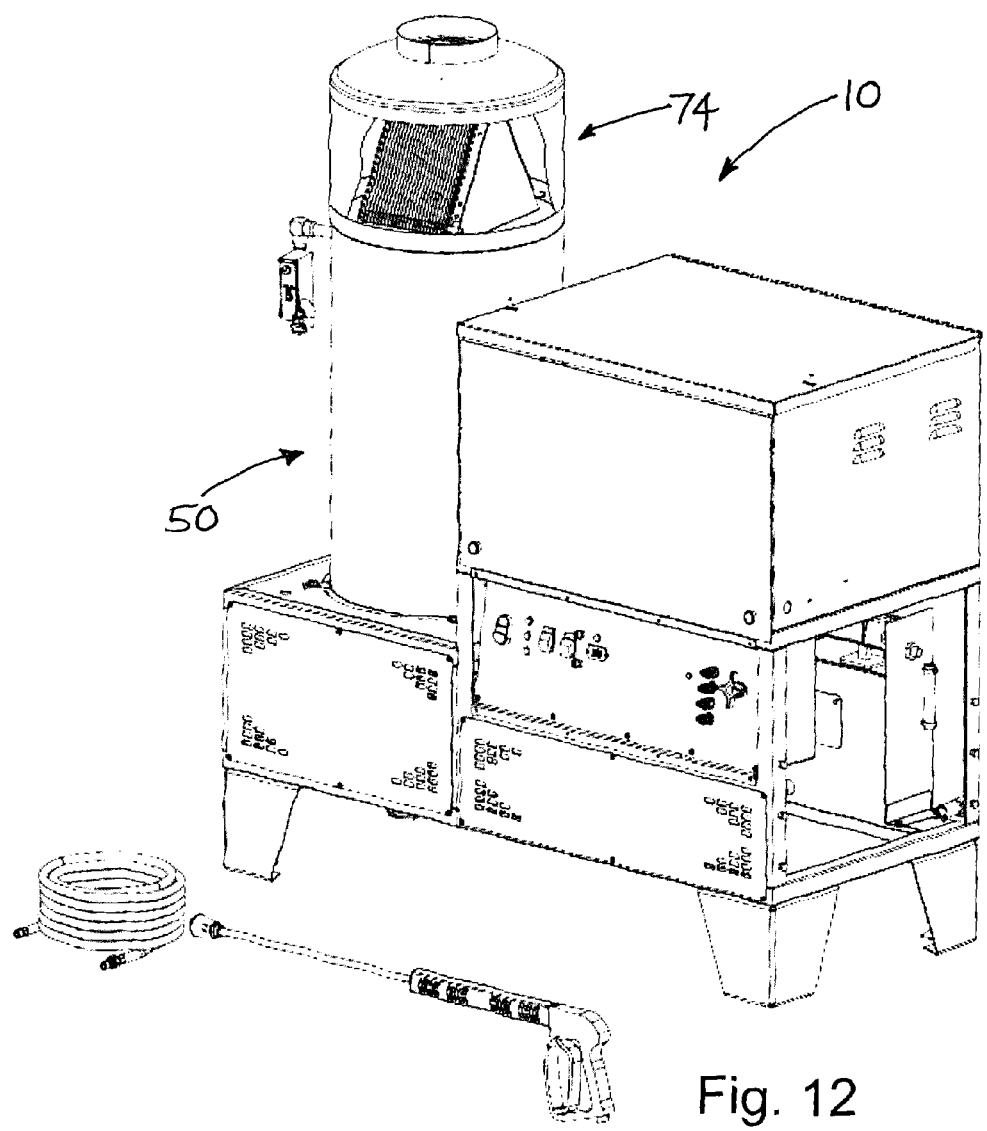
FIG. 12 is a schematic perspective view of a fluid heating apparatus configured for generally stationary use.

With reference now to the drawings, and in particular to FIGS. 1 through 12 thereof, a new system for waste heat recovery for a fluid heater embodying the principles and concepts of the disclosed subject matter will be described.

The disclosure relates a number of innovations that may relate to a variety of apparatus, but are particularly useful on a fluid heating apparatus 10 that heats a flow of fluid moving along a fluid path 12 extending through the apparatus 10 between a fluid inlet 14 and a fluid outlet 16, so that the temperature of the fluid exiting the fluid outlet is greater than the temperature of the fluid entering the fluid inlet. The fluid heating apparatus 10 may also increase a pressure of the fluid between the fluid inlet 14 and the fluid outlet 16, so that the fluid exiting the fluid outlet has a greater pressure than fluid entering the fluid inlet. In some implementations, the fluid heating apparatus 10 is utilized to wash objects using the hot fluid exiting the fluid outlet at high pressure, which can produce steam when the heated high pressure water is exposed to the atmosphere. Typically, but not necessarily, the fluid is a liquid and the liquid is water. The water at the inlet 14 may be at ambient temperature and a pressure that is supplied by a municipal water supply, and the water at the outlet 16 may have a significantly higher temperature and pressure. The fluid heating apparatus 10 may also be implemented on a portable platform, and will be illustratively described herein as a portable unit, although the benefits of the disclosure are not limited to a portable unit and may be employed, for example, on a stationary or relatively stationary unit. For example, the apparatus 10 may be implemented on a trailer to provide portability, or a skid that may be picked up and transported between locations.

In greater detail, the fluid heating apparatus 10 may include a frame 18 with a front 20 and a rear 22, and laterally-opposite first 24 and second 26 sides. The frame 18 may comprise various portions, including a main frame portion 28 and a handle frame portion 30, as well as a linking frame portion 32. The main frame portion 28 may extend from the front 20 of the frame to the rear 22, and may include a first side structure 34 and a second side structure 36. Each of the side structures 34, 36 may have a front end and a rear end that generally correspond in location to the front 20 and rear 22 of the frame, respectively. The linking frame portion 32 may link the first 34 and second 36 side structures of the main frame portion to support various elements of the apparatus 10. The linking frame portion 32 may include a front portion located at the front of the frame and a rear portion located at the rear of the frame. The handle frame portion 30 may provide a handle or handhold for a user to move the apparatus around. The handle frame portion 30 may extend upwardly from a location between the front 20 and rear 22 of the frame 18, and may then extend rearwardly to the rear 22. A section of the handle frame portion may extend transversely between the sides 24, 26 of the frame, and the section may form a handle to be gripped by the user. The frame described herein is merely illustrative of the variety of frames that may be employed, and therefore the apparatus 10 is not limited to any particular frame configuration.

The apparatus 10 may also include a plurality of wheels mounted on the frame 18 for permitting the frame and the supported elements of the apparatus 10 to move across a floor or ground surface. The plurality of wheels may include a pair of front wheels 38 mounted on the frame toward the front 20 of the frame and a pair of rear wheels 39 mounted on the frame toward the rear 22. Each of the front wheels 38 may be mounted for swivel movement with respect to the frame 18, so that each of the wheels 38 is free to rotate about a substantially vertical axis. Each front wheel 38 may also be free to rotate independently of the other front wheel. Each of the front wheels 38 may be mounted on the front end of one of the side structures of the main frame portion 28, although other positionings may be employed. In some embodiments, each front wheel 38 has a diameter and each rear wheel 39 has a diameter, and the diameter of the front wheels is substantially the same as the diameter of the rear wheels. The rear wheels 39 may be mounted on a common axle. As noted above, the apparatus may optionally be configured without wheels and may employ a skid to some type of more stationary mounting.

A fluid accumulating tank 40 may be included in the apparatus 10 for accumulating fluid in the fluid path 12, although the presence of an accumulating tank 40 is not critical to the function of the apparatus. The fluid accumulating tank 40 may thus be in fluid communication with the fluid path 12, and an interior of the tank may form a portion of the fluid path. The tank 40 may function as an enlargement of the fluid path for accommodating an extra quantity of fluid so that the remainder of the fluid path between the tank 40 and the fluid outlet 16 is provided with a supply of fluid even if a main fluid supply is subject to pressure and flow rate variations. The tank 40 may have an auxiliary inlet 42 for an auxiliary flow of fluid described below. The fluid accumulating tank 40 may have an accumulating tank outlet 44. The fluid accumulating tank 40 may be mounted on one of the sides 24, 26 of the frame, such as the first side 24. The accumulating tank 40 may be located at least partially between the front 38 and the rear 39 wheels on the first side 24 of the frame. The accumulating tank 40 may extend over the rear wheel 39 on the first side, and may also extend at least partially over the front wheel 38.

The fluid heater apparatus 10 may also include a fluid pumping assembly 46 that is configured to increase a pressure characteristic of the fluid between the fluid inlet 14 and fluid outlet 16. The fluid pumping assembly 46 may be a mechanical pump and may be operated by any means, such as electricity or gas engine. The fluid pumping assembly 46 may be in fluid communication with, and form a portion of, the fluid path 12. In some embodiments, the fluid pumping assembly 46 is in fluid communication with the accumulating tank outlet 44 to draw fluid from the interior of the tank 40. The fluid pumping assembly 46 may thus increase a pressure of the fluid from a first, relatively lower pressure of the fluid in the interior of the accumulating tank 40 and raise it to a second, relatively higher pressure leaving the fluid pumping assembly at a pumping assembly outlet 48. The fluid pumping apparatus 46 may comprise a fluid pump of any suitable type. The first pressure may be a pressure that is available from a conventional water supply system, and the second pressure may be a pressure that is utilized for high pressure washing. Illustratively, the first pressure may be in the range of 0 psi to approximately 200 psi, and in many applications the first pressure may be in the range of 0 psi to approximately 120 psi. The second pressure may range above approximately 500 psi.

A heating assembly 50 may be included in the heater apparatus 10 to heat the fluid between the fluid inlet 14 and the fluid outlet 16, and may form a portion of the fluid path 12 therebetween. The heating assembly 50 may be in fluid communication with the pumping assembly 46 via the pumping assembly outlet 48. The heating assembly 50 may have a heating assembly outlet 52, and the outlet 52 may form the fluid outlet 16 of the fluid heating apparatus 10. The heating assembly 50 may be mounted on the frame 18, and may be located toward the rear 22 of the frame, although this positioning is not critical to the apparatus 10.

In many embodiments of the apparatus 10, the heating assembly 50 includes a heating chamber 54, which may have any of a variety of different configurations including a vertical orientation where the exhaust gases of combustion move generally vertically in the chamber, or a horizontal orientation where the exhaust gases move generally horizontally in the chamber. In some embodiments, the heating chamber 54 has an interior 56, and a top 58 and a bottom 59. The heating chamber 54 may have an exhaust opening 60 for exhaust gases to pass out of the interior 54 of the heating chamber. The exhaust opening 60 may be located on one side of the heating chamber, and in such embodiments the exhaust gases are not exhausted out of the top 58 of the chamber. The exhaust opening 60 may be located below the top 58 of the heating chamber, but may be located adjacent to the top. While the illustrative heating chamber 54 is generally vertically oriented, it should be recognized that many of the features discussed herein may apply to a heating chamber having a generally horizontal orientation.

In greater detail, the illustrative heating chamber 54 may comprise a perimeter wall 62 that defines the interior 56 of the heating chamber. The exhaust opening 60 may be formed in the perimeter wall 62, and may be located toward a top end 64 of the perimeter wall. The perimeter wall 62 may be substantially cylindrical in shape, and may be centered about a substantially vertical axis. The perimeter wall may incorporate an insulating material to reduce the temperature of the outer surface of the perimeter wall relative to the temperature in the interior 56.

The heating chamber 54 may also include a top wall 66 that is mounted on the perimeter wall 62 and that closes the top end 64 of the perimeter wall. The top wall 66 may be continuous between the extent of the perimeter wall to prevent exhaust gases from passing out of the interior 56 of the heating chamber through the top end 64 of the perimeter wall.

The heating assembly 50 may further include a heat source such as a burner 68 or other combustion source that produces heated gases in the interior 56 of the heating chamber. For example, the burner 68 may be configured to burn a liquid fuel such as oil or a gaseous fuel such as natural gas or liquefied petroleum (LP) gas, as well as other hydrocarbon-based fuels. The burner 68 may have a variety of configurations, such as up-firing, side-firing, or down firing. In an illustrative embodiment, the burner 68 may be positioned toward the bottom 59 of the heating chamber 54, and may be oriented to direct a flame and the exhaust gases from the flame in a substantially upward direction in the interior of the heating chamber. The combustion of fuel by the burner produces water vapor in the exhaust gases that are also produced by the combustion, as well as the water vapor that is present in the ambient air drawn into the burner to support the combustion. A fluid circulating conduit 70 of the heating assembly 50 may be positioned in the interior 56 of the heating chamber to circulate fluid in the fluid path in the exhaust gases produced by the burner. The fluid circulating conduit 70 may thus form a portion of the fluid path 12, and may be formed into a plurality of coils, although this configuration is not critical.

The fluid heating apparatus 10 may also include a fuel tank 72 for holding a quantity of fuel to fuel the heating assembly 50, and more specifically the burner 68. The use of a fuel tank is not critical to the apparatus, and may be omitted in some configurations, such as those in which a gaseous fuel is utilized. The fuel tank 72 is in fluid communication with the burner 68 to provide the burner with fuel from the tank 72. The fuel tank 72 may be mounted on the frame 16, and may be located on one side of the frame such as on the second side 26 of the frame opposite of the fluid accumulating tank 40 that may be located on the first side 24 of the frame. The fuel tank 72 may be located at least partially between the front 38 and the rear 39 wheels on the second side of the frame. The fuel tank 72 may extend over the rear wheel 39 on the second side, and may also extend at least partially over the front wheel 38.

Significantly, the apparatus 10 includes a heat recovery assembly 74 that is configured to recover heat from the exhaust gases. The recovery of the heat from the exhaust gases may or may not occur after the exhaust gases have left or passed out of the interior of the heating assembly 50. The heat recovery assembly 74 may be configured such that exhaust gases emanating from the heating chamber pass through an interior 76 of the heat recovery assembly, where heat exchanging means are positioned to transfer the heat contained in the exhaust gases to another medium, such as fluid moving along the fluid path 12. The heat recovery assembly 74 is primarily and substantially located outside of the heating assembly 50, although there may be some connection of the recovery assembly 74 to the heating assembly 50 for the purposes of, for example, guiding the exhaust gases from the heating assembly to the recovery assembly.

The transfer of heat to the fluid in the fluid path 12 may occur before the pressure of the fluid has been increased, such as by the pumping assembly 46. Thus, in such embodiments, the heat recovery assembly 74 acts to pre-heat the fluid in the fluid path prior to the fluid being pumping to a higher pressure, and the heat recovery assembly 74 may have or form the fluid inlet 14 for receiving fluid into the fluid heating apparatus 10. This is in contrast to the fluid moving through the heating assembly 50, the pressure of which has been raised by the pumping assembly 46 or other suitable means. Significantly, the elements of the heat recovery assembly 74 are not subjected to the higher pressures that are present in the fluid flow moving through the heating assembly 50 and out of the fluid outlet 16 of the apparatus, and as a result, elements of less sturdy and bulky character may be utilized in the heat recovery assembly to decrease manufacturing costs and increase the transfer of heat.

The heat recovery assembly 74 may have an exhaust gas intake 78 for receiving exhaust gas into the assembly 74 and an exhaust gas outlet 80 for expelling the exhaust gas from the assembly 74. The exhaust gas inlet 78 may receive exhaust gases from the heating assembly 50, and those gases may then be passed out of the interior 76 of the heat recovery assembly through the outlet 80.

In greater detail, the heat recovery assembly 74 may comprise a housing 82 although the use of a housing is not critical to the apparatus. The housing 82 may be mounted on the heating assembly 50, although other positions and relationships to the heating assembly may be utilized. The housing 82 may define the interior 76 (or a portion thereof) of the heat recovery assembly 74. In the illustrative embodiments, the housing includes a first wall 84 and a second wall 86. The first wall 84 may include a receiving opening 88, which in some embodiments may form the exhaust gas intake 78 of the heat recovery assembly 74, while in other embodiments structure may be interposed between the housing and the perimeter wall 62 of the heating assembly 50. The second wall 86 may be positioned opposite of the first wall on the housing, and may include at least one aperture for permitting exhaust gases in the interior of the housing to exit the interior. The aperture or apertures may form the exhaust gas outlet 80 for the recovery assembly 74. The second wall 86 may be oriented substantially parallel to the first wall, although this is not critical.

The housing 82 may also include side walls 90 that extend between the first 84 and second 86 walls to form a perimeter about the interior 76 of the housing. The side walls 90 may include a top side wall 92, a first side wall 94, a second side wall 96, and a bottom side wall 98, which may form a substantially rectangular perimeter, although other perimeter shapes may be employed.

An exhaust guide may be employed to guide exhaust gases from the heating assembly 50 to the heat recovery assembly 74. Illustratively, the exhaust guide may comprise a duct 100 forming a passage for the exhaust gases between the heating chamber 54 and the housing 82. The duct 100 may be connected to the perimeter wall 62 of the heating chamber 54 and the first wall 84 of the housing, with the passage of the duct 100 being in fluid or gaseous communication with the exhaust opening 60 of the heating chamber and the receiving opening 88 of the housing 82. The use of the exhaust guide allows for a degree of separation between the housing 82 of the heat recovery assembly 74 and the heating chamber 54, and facilitates an orientation of the housing 82 of the heat recovery assembly 74.

The heat recovery assembly 74 may further include at least one heat exchanger 102, which may be positioned in the interior 76 of the housing 82. In the illustrative embodiments, a pair of heat exchangers 102, 104 is employed in the assembly 74, although one or more than two exchangers may be used. The heat exchangers may comprise air to liquid heat exchangers, so that heat from the exhaust gases passing over the heat exchangers is transferred to the fluid or liquid moving through the fluid path. For example, each of the heat exchangers may comprise a conduit through which the fluid on the fluid path passes, and fins mounted on the conduit that draw heat from the gases passing over them and transfer the heat to the conduit (and in turn the fluid passing through the conduit). The heat exchangers are not limited to this configuration, although this configuration has been found to be highly suitable for the purposes of the apparatus 10. More specifically, the inclusion of fins on the heat exchangers, while beneficial, is not required, In embodiments in which multiple heat exchangers are utilized, the heat exchangers 102, 104 may be configured to encounter the flow of exhaust gases in parallel with respect to each other, although two or more exchangers may be oriented in a serial arrangement to the exhaust flow such that the exhaust flow encounters each of the exchangers one after another. In embodiments in which multiple heat exchangers are employed, the heat exchangers may be positioned in substantially the same plane so that parallel air flows through the exchangers may be used. Other configuration of the multiple heat exchangers may be employed, such as where the planes of the heat exchangers are angled with respect to each other. For example, the planes of the heat exchangers may be in a vertically-inclined arrangement that forms an inverted V shape such that upper end of the exchangers are closer to each other and the lower ends are further apart. The flow of the exhaust gases passing through the exchangers may separate into to divergent flows. Other arrangement geometries for multiple heat exchangers may also be used.

In the illustrative embodiment, the fluid path 12 passes through the one or more heat exchangers in series, so that the fluid moving along the path 12 passes through all of the exchangers. Optionally, the fluid path may move through multiple heat exchangers in parallel. This parallel flow may be accomplished by dividing the fluid flow downstream from (after) the fluid inlet 14, but upstream (before) the fluid path encounters the exchangers. The fluid flow may be rejoined downstream from the heat exchangers. It should be recognized that the fluid path 12 could pass through multiple exchangers in both series and parallel arrangements. Also, a plurality of heat exchangers may include up to four or more heat exchangers. While a heat exchanger with a generally planar configuration is depicted, it is contemplated that heat exchangers with other configurations may be employed, such those having cylindrical and even domed shapes as well as other shapes.

A support bracket 106 may be implemented in the housing on which the exchangers are mounted, and the support bracket may be utilized to space or separate the heat exchangers from the first wall 84 so that the flow of exhaust gases is able to reach a greater area of the exchangers even when a smaller receiving opening 88 is formed in the first wall. The bracket 106 may also serve to support the exchangers in a spaced relationship with the second wall 86.

A significant feature of the heat recovery assembly 74 is the optional orientation of the heat exchanger or exchangers of the assembly 74, although the orientation of the exchanger is not a critical feature of the recovery assembly. The exchangers extend in a major plane, which is generally oriented perpendicularly to the plane of the fins of the exchanger, and the major plane may be inclined from a vertical orientation so that the major plane is not vertically oriented and is not horizontally oriented. The major plane of the exchangers may be inclined or tilted at angles between 0 and approximately 90 degrees (inclusive), and in some embodiments an angle of approximately 5 degrees to approximately 45 degrees from a vertical plane. In this inclined orientation, the plane of the fins of the heat exchanger may be vertically oriented. One advantage of the inclined orientation is that dripping of the condensation on the fins from the fins is facilitated, as the edges of the fins are also inclined and do not present a horizontal edge.

Another significant optional feature of the apparatus 10 is the capability to recover heated condensation from heat exchangers, so that the collected condensation may optionally be introduced into the fluid flow in the fluid path, although the collected condensation may be disposed of in other ways, such as by, for example, draining the condensation to the ground or collection in a separate tank for periodic disposal. Advantageously, the collection of condensed water from the exhaust gases may also function to collect particulate matter from the exhaust gases as the particulate matter collects on the heat exchanger with the condensed vapor, and thus may provide a partial "scrubbing" function on the exhaust gases.

To reintroduce the collected condensation into the fluid flow, the illustrative embodiments of the apparatus 10 include a condensation collection assembly 108 which employs a drain 110 in the bottom of the housing 82 to drain condensation that drips from the heat exchangers into the interior of the housing of the heat recovery assembly 74. The liquefied condensation collects in the bottom of the interior of the housing, and is able to drain from the interior through a drain conduit 112. The drain conduit 112 is in fluid communication with the fluid path 12, such as in communication with the auxiliary inlet 42 of the accumulating tank 40, where the condensation liquid is able to mix with the fluid that has entered through the fluid inlet 14.

Another aspect of the disclosure relates to a method of recovering heat from a fluid heater, such as from the exhaust gases emanating from the heater assembly that is exhausted to the environment. The method may include providing a fluid heater that defines a fluid path between a fluid inlet and a fluid outlet for the fluid heater. The fluid heater may have a heating assembly and a pumping assembly, as well as other elements described herein. The method may also include receiving a flow of fluid at the fluid inlet of the fluid path of the fluid heater, and the fluid flow may be at a first pressure and a first temperature at the fluid inlet. The method may also include preheating the fluid flow by transferring heat from exhaust gases produced by the heating assembly to the fluid flow moving along the fluid path, and the exhaust gases may have passed out of the heating chamber of the heating assembly. The step of transferring heat may include passing the fluid flow moving along the fluid path through a stream of the exhaust gases emanating from the heating assembly. The step of transferring heat may include passing the fluid flow through one or more heat exchangers that form a portion of the fluid path and that are exposed to the stream of exhaust gases from the heating assembly. The preheating of the fluid flow may occur outside of the heating chamber of the heating assembly, although it may also occur inside the heating chamber.

The method may also include raising the pressure of the fluid flow moving along the fluid path from the first pressure to a second pressure after the preheating has been performed on the fluid flow. The second pressure is higher than the first pressure. The method may also include heating the fluid flow moving along the fluid path at the second pressure by passing the fluid flow through the heating chamber of the heating assembly. The majority of the temperature increase in the fluid flow occurs in the heating chamber when compared to the preheating of the fluid flow prior to raising the pressure of the fluid flow.

Another aspect of the method may be collecting vaporized fluid from the exhaust gases, condensing that vapor into a liquid, and adding that condensed liquid to the fluid flow. In some implementations, vaporized water in contained in the exhaust gases due to the combustion of the fuel, and the vaporized water condenses on a heat exchanger that has the relatively cooler fluid flow moving through it. For example, the water may condense on the surfaces of the heat exchanger, such as on the fins of the heat exchanger. As the fluid accumulates on the fins, the fluid may tend to drip from the fins, and the condensation is collected and directed to the fluid flow, such as into the fluid accumulating tank.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A fluid heating apparatus having a fluid inlet, a fluid outlet, and a fluid path extending between the fluid inlet and fluid outlet, the apparatus comprising:
   a fluid pumping assembly configured to increase a pressure characteristic of the fluid between the fluid inlet and fluid outlet, the fluid pumping assembly forming a portion of the fluid path to increase the pressure of fluid moving along the fluid path;
   a heating assembly configured to heat the fluid between the fluid inlet and the fluid outlet, the heating assembly forming a portion of the fluid path to increase a temperature of the fluid moving along the fluid path; and
   a heat recovery assembly configured to recover heat from the exhaust gases, the heat recovery assembly forming a portion of the fluid path to transfer recovered heat to fluid moving through the fluid path.

2. The apparatus of claim 1 wherein the heat recovery assembly is configured to heat fluid on the fluid path prior to the fluid passing through the heating assembly.

3. The apparatus of claim 1 wherein the heat recovery assembly is configured to heat fluid on the fluid path prior to the fluid path passing through the fluid pumping assembly.

4. The apparatus of claim 1 wherein the heat recovery assembly includes a plurality of heat exchangers.

5. The apparatus of claim 4 wherein the fluid path passes through the plurality of heat exchangers in a series arrangement.

6. The apparatus of claim 4 wherein exhaust gases from the heating assembly pass through the pair of heat exchangers of the heat recovery assembly in parallel.

7. The apparatus of claim 1 additionally comprising a fluid accumulating tank in fluid communication with the fluid path; and wherein the fluid path passes through the heat recovery assembly prior to passing through the fluid accumulating tank.

8. The apparatus of claim 1 additionally comprising a fluid accumulating tank in fluid communication with the fluid path;
   wherein the heat recovery assembly is configured to heat fluid on the fluid path prior to the fluid passing through the heating assembly;
   wherein the heat recovery assembly is configured to heat fluid on the fluid path prior to the fluid path passing through the fluid pumping assembly;
   wherein the heat recovery assembly has an exhaust gas intake and an exhaust gas outlet, the heat recovery assembly being configured such that exhaust gases emanating from the heating assembly pass through an interior of the heat recovery assembly, at least one heat exchanger being positioned in the interior of the heat recovery assembly;

wherein the fluid path passes through the heat recovery assembly prior to passing through the fluid accumulating tank;

wherein the heat recovery assembly includes a condensation collection assembly configured to collect condensation from the exhaust gases on a heat exchanger of the recovery assembly;

wherein the condensation collection assembly directs condensed fluid collected from the exhaust gases into the fluid path;

wherein the condensed fluid from the exhaust gases is directed to the fluid accumulating tank.

9. The apparatus of claim 1 wherein the heat recovery assembly includes a condensation collection assembly configured to collect condensation on a heat exchanger of the recovery assembly.

10. The apparatus of claim 1 wherein the condensation collection assembly directs condensed fluid collected into the fluid path.

11. The apparatus of claim 10 additionally comprising a fluid accumulating tank in fluid communication with the fluid path; and wherein the condensed fluid is directed to the fluid accumulating tank.

12. The apparatus of claim 9 wherein the condensation collection assembly further collects particulate matter in the collected condensation.

13. A fluid heating apparatus having a fluid inlet, a fluid outlet, and a fluid path extending between the fluid inlet and fluid outlet, the apparatus comprising:

a fluid pumping assembly configured to increase a pressure characteristic of the fluid between the fluid inlet and fluid outlet, the fluid pumping assembly forming a portion of the fluid path to increase the pressure of fluid moving along the fluid path;

a heating assembly configured to heat the fluid between the fluid inlet and the fluid outlet, the heating assembly forming a portion of the fluid path to increase a temperature of the fluid moving along the fluid path; and a condensation collection assembly configured to collect condensation from exhaust gases produced by the heating assembly;

wherein particulate matter is collected with the collection of the condensed fluid from the exhaust gases.

14. The apparatus of claim 13 wherein the condensed fluid collected from the exhaust gases is directed into the fluid path.

15. The apparatus of claim 13 additionally comprising a heat recovery assembly configured to recover heat from the exhaust gases after the exhaust gases have left the heating assembly, the heat recovery assembly forming a portion of the fluid path to transfer recovered heat to fluid moving through the fluid path, the heat recovery assembly including at least one heat exchanger; and wherein the condensation collection assembly is configured to collect condensation on a heat exchanger of the heat recovery assembly.

16. A method of recovering heat from a fluid heater, comprising:

providing a fluid heater defining a fluid path between a fluid inlet and a fluid outlet for the fluid heater, the fluid heater having a heating assembly and a pumping assembly;

receiving a flow of fluid at the fluid inlet of the fluid path of the fluid heater, the fluid flow being at a first pressure at the fluid inlet;

preheating the fluid flow by transferring heat from exhaust gases produced by the heating assembly to the fluid flow moving along the fluid path, the exhaust gases being generated by a heating chamber of the heating assembly;

raising the pressure of the fluid flow moving along the fluid path from the first pressure to a second pressure after the preheating of the fluid flow, the second pressure being higher than the first pressure; and heating the fluid flow moving along the fluid path at the second pressure by passing the fluid flow through the heating chamber of the heating assembly.

17. The method of claim 16 additionally comprising adding the condensed liquid to the fluid flow along the fluid path.

* * * * *